Dec. 27, 1927.  
E. E. CLARK  
1,653,889  
POWER ACTUATING MEANS FOR TRICYCLES AND THE LIKE  
Filed Nov. 27, 1926  
2 Sheets-Sheet 1
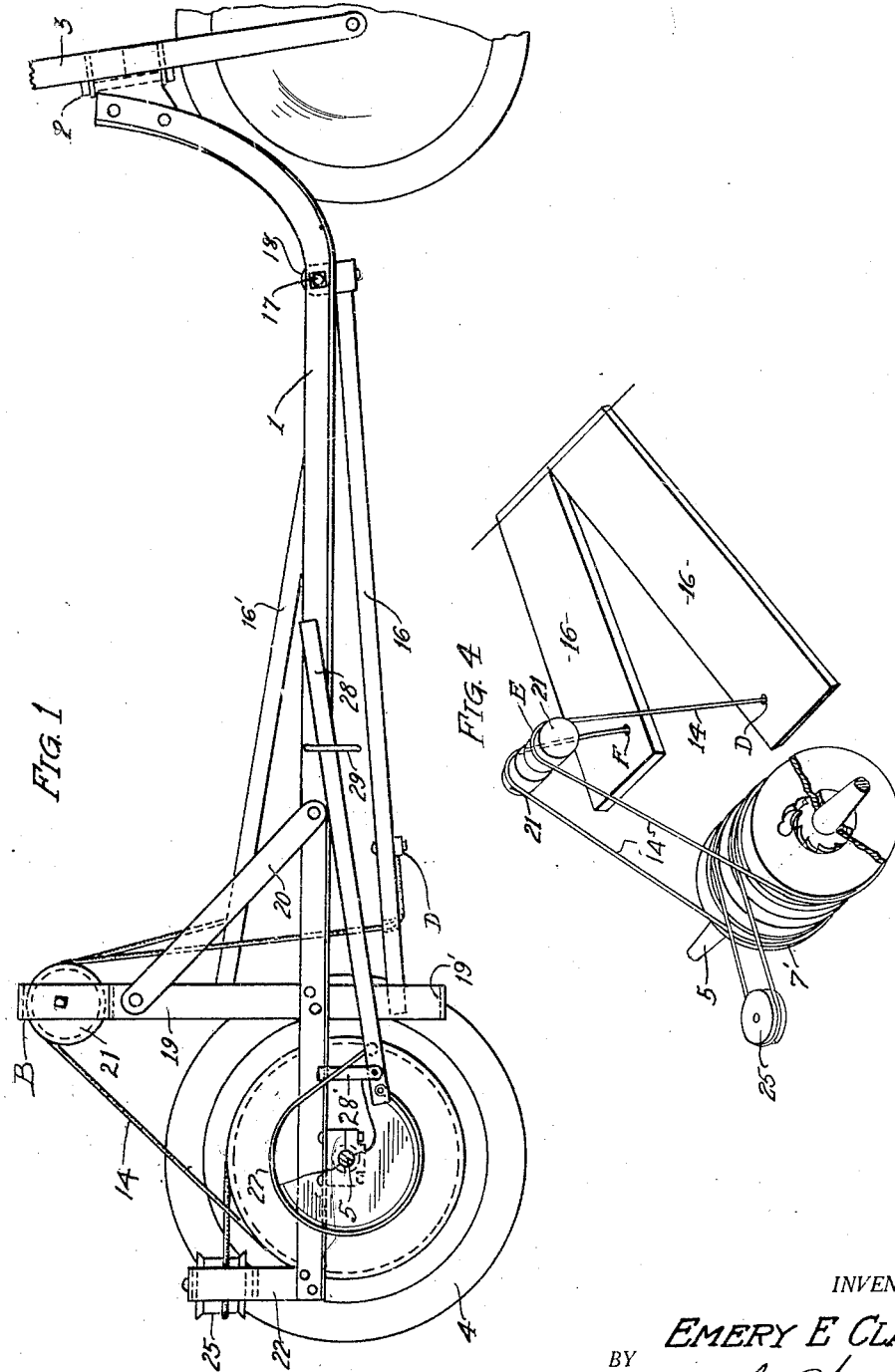
INVENTOR.  
EMERY E CLARK  
BY  
21.G.Charles  
ATTORNEY.

Dec. 27, 1927. 1,653,889
E. E. CLARK
POWER ACTUATING MEANS FOR TRICYCLES AND THE LIKE
Filed Nov. 27, 1926  2 Sheets-Sheet 2
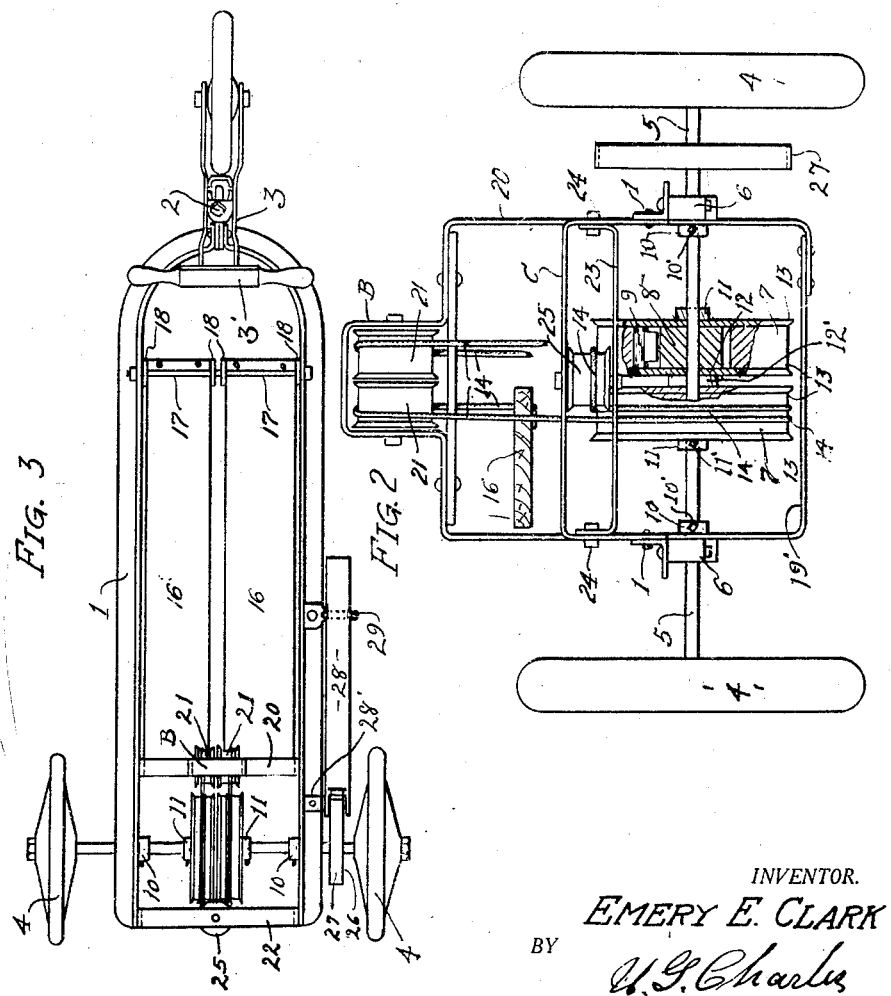
INVENTOR.
EMERY E. CLARK
BY
*U. G. Charles*
ATTORNEY.

Patented Dec. 27, 1927.

1,653,889

UNITED STATES PATENT OFFICE.

EMERY E. CLARK, OF TOPEKA, KANSAS.

POWER-ACTUATING MEANS FOR TRICYCLES AND THE LIKE.

Application filed November 27, 1926. Serial No. 151,135.

My invention relates to improvements in a power actuating means for tricycles and the like.

The object of my invention is to construct a driving mechanism for a tricycle in such a way that the operator may properly exercise in standing posture.

A further object of my invention is to provide a driving mechanism for a tricycle that cannot be driven rearward.

A still further object of my invention is to provide a driving mechanism that automatically brakes itself from rearward movement down an inclined road.

A still further object of my invention is to provide a brake lever in close proximity to the pedals as a convenient position for the operator.

A still further object of my invention is to provide a driving mechanism operative by long or short strokes of the pedals.

A still further object of my invention is to provide a driving mechanism excluding the use of chains and sprockets, resulting in less danger for the operator and others associated in the amusement.

These and other objects will hereinafter be more fully explained.

Referring to the drawings:

Fig. 1 is a side view of the tricycle.

Fig. 2 is a rear view, parts removed for convenience of illustration.

Fig. 3 is a reduced plan view of Fig. 1.

Fig. 4 is a perspective schematic view of the actuating means.

The mechanism herein disclosed consists of a frame 1, the front end of which is curved upward to a convenient position to receive a hinge means 2 that connects with the steering wheel post 3, the said post having transversely positioned handle bars 3′ on the upper end thereof. The opposite or rear end of the frame is carried by a pair of wheels 4 rigidly attached to a shaft 5, the said shaft being journaled in bearings 6 which are rigidly attached to frame 1.

Centrally positioned and rotatably mounted on the shaft are a pair of pulleys 7 and 7′. Concentrically housed within the pulleys and rigidly attached to the said shaft are toothed members 8 being the element by which said shaft is rotated through the medium of a pawl 9 positioned in each of the pulleys to engage with the teeth of said members. As a means to centrally position the frame on the shaft, collars 10 are placed adjacent the sides thereof and rigidly attached to the shaft by means of a set screw 10′. The pulleys are held in smooth working position on the toothed members by collars 11 securely fastened by set screws 11′.

As an inclosing means for the toothed members and pawls housed by the pulleys I have provided discs 12 seated flush in the pulleys and removable therefrom when the pulley is withdrawn from the toothed members. As a separating means for the pulleys a washer 12′ is placed therebetween engaging on the face of the said discs.

The propelling wheels 4 may rotate independent of each other as one is rotatably placed on its respective end of the shaft, the pulleys having pawls engaging as heretofore stated will alternately drive the shaft in one continuous direction. The said pulleys have flanges 13 on both sides thereof as means to peripherally retain in proper working position a belt or cord 14 wound thereon.

The actuating means consists of a pair of pedals 16 and 16′, the forward ends of which are hingedly connected to the frame by means of a cross rod 17, the said rod engaging through the apertured upward turned ends 18 of a strap or hinge to which the pedals are attached. The rear ends of the pedals are carried by the ends of the cord or belt 14 rigidly connected thereto. Then by reciprocating the pedals the pulleys alternately are made to drive the shaft in one continuous direction propelling the tricycle.

Vertically positioned on the frame near the rear ends of the pedals is a standard 19, the said standard being braced by members 20. Centrally positioned on the top of the frame is an extended portion as at B in which is trunnioned a pair of flanged pulleys 21 functioning as carrying means for the weight imposed on the pedals by the medium of the cord. Should the cord break the pedal in the downward movement will contact and be carried by the cross member 19′. At the extreme rear end of the frame is vertically positioned and rigidly attached a member 22, the said member having a horizontal portion as at C: paralleling therewith is a cross member 23 rigidly attached to the sides by means of bolts 24. Centrally positioned and trunnioned between the parallel members is a flanged pulley 25 functioning as separating and tensioning means to engage the cord or belt centrally so that the belt extending from both sides of said pulley may be wound on the pulley in alignment with their respective sides by which arrangement the alternate reciprocations of the pedals will drive the shaft in one continuous direction.

To properly apply the cord or belt to the power actuating means: one end of the cord is firmly attached to the rear end of pedal 16 as at D and from thence upward over its aligned pulley 21 as at E, and downward continuing one or more times around the pulley 7 and from thence around pulley 25 returning and having a like wind around the pulley 7′ and from thence over the pulley adjacent the pulley 21, and downward to the rear end of the pedal 16′ connecting as at F. It is now readily seen that by the reciprocation of the pedals alternately the cord driving means will see-saw actuating the driving pulleys 7 and 7′ in opposite directions driving the shafts in one continuous direction. As a means for a braking mechanism a drum 26 is rigidly attached to the shaft having a brake band 27 to engage thereon, said band being carried by a pedal 28 which extends forward paralleling the sides of frame 1, as a convenient position on which to place the foot of the operator when applying the brake. The said pedal is carried by a strap 28′ attached to the frame 1, to which the pedal is pivotally connected, this being the fulcrum point for the contraction of said band. The said pedal has a guide member 29 that is rigidly attached to the frame as a guard for proper alignment when in operation.

Such modifications may be employed as lie within the scope of the appended claim.

Having thus described my invention, what I claim as new and desire to secure by Letters Patent is:—

In a power actuating means for tricycles and the like, a rectangular frame having the front end curved upward, to which is attached a guide wheel, a horizontally disposed frame on the rear of the first said fame in which is vertically trunnioned a flanged pulley, a frame vertically positioned intermediate the ends of the first said frame, having an extended portion thereof centrally positioned, and a pair of flanged pulleys horizontally trunnioned therein, a shaft trunnioned on the rear end of the first said frame, said shaft having a wheel rigidly connected on one end and a wheel revolvably connected on the other end as means to prevent friction when turning to the right or left, a pair of flanged pulleys centrally positioned on the shaft, a toothed member concentrically engaging in the pulleys and rigidly attached to the shaft, a pawl carried by each of said pulleys and tensioned to engage with the teeth of said toothed member, for rotation of the shaft in one continuous direction as the said pulleys rotate alternately, a pair of pedals and a cross rod positioned in the first said frame, the forward end of said pedals pivotally carried by the cross rod, a single piece of cable having a portion thereof wound on each of the pulleys carried by the shaft so that a central portion loops around the flanged pulley vertically trunnioned in the rear frame, the end portions of the cable to engage over the pulleys carried by the intermediate frame, and the rear end of the pedals carried by the ends of the cable to see-saw the cable as motive power to rotate the rear wheels, all as and for the purpose described.

EMERY E. CLARK.